(12) United States Patent
Ishikawa

(10) Patent No.: US 7,881,372 B2
(45) Date of Patent: Feb. 1, 2011

(54) IMAGE PROCESSING DEVICE AND IMAGE PROCESSING METHOD

(75) Inventor: Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1339 days.

(21) Appl. No.: 11/395,240

(22) Filed: Apr. 3, 2006

(65) Prior Publication Data

US 2006/0228035 A1     Oct. 12, 2006

(30) Foreign Application Priority Data

Apr. 6, 2005    (JP)   ............................. 2005-110070

(51) Int. Cl.
*H04N 7/12*     (2006.01)
(52) U.S. Cl. .................................. 375/240.03; 382/252
(58) Field of Classification Search ............ 375/240.03; 382/225
See application file for complete search history.

(56) References Cited

U.S. PATENT DOCUMENTS

| | | | | |
|---|---|---|---|---|
| 5,115,241 | A | 5/1992 | Ishikawa | 341/143 |
| 5,436,981 | A | 7/1995 | Ishikawa | 382/173 |
| 5,565,994 | A | 10/1996 | Eschbach | 358/298 |
| 5,675,716 | A * | 10/1997 | Shu | 358/1.9 |
| 5,784,496 | A * | 7/1998 | Mantell | 382/237 |
| 5,949,965 | A | 9/1999 | Gondek | 395/109 |
| 5,973,803 | A | 10/1999 | Cheung et al. | 358/534 |
| 6,084,984 | A | 7/2000 | Ishikawa | 382/173 |
| 6,363,172 | B1 | 3/2002 | Cheung et al. | 382/167 |
| 6,552,822 | B1 * | 4/2003 | Kishimoto | 358/3.03 |
| 6,671,071 | B1 * | 12/2003 | Kletter | 358/1.9 |
| 6,917,446 | B2 * | 7/2005 | Tanaka et al. | 358/1.9 |
| 2003/0067617 | A1 * | 4/2003 | Kato et al. | 358/1.9 |
| 2004/0196408 | A1 | 10/2004 | Ishikawa et al. | 348/616 |
| 2004/0196478 | A1 | 10/2004 | Imafuku et al. | 358/1.9 |
| 2005/0025374 | A1 | 2/2005 | Ishikawa | 382/252 |

FOREIGN PATENT DOCUMENTS

| | | |
|---|---|---|
| JP | 8-279920 | 10/1996 |
| JP | 9-139841 | 5/1997 |
| JP | 11-10918 | 1/1999 |

OTHER PUBLICATIONS

Patent Abstracts of Japan, JP 2003-224730, vol. 2003, No. 12, Dec. 5, 2003, application published Aug. 8, 2003.

* cited by examiner

*Primary Examiner*—Tung Vo
*Assistant Examiner*—Anner Holder
(74) *Attorney, Agent, or Firm*—Fitzpatrick, Cella, Harper & Scinto

(57) ABSTRACT

The present invention provides an image processing method and device which can both quickly and easily execute a pseudo halftone process with a large number of output gray levels and which can always execute the pseudo halftone process in the same manner regardless of the number of output gray scales. The present invention provides an image processing device that executes a pseudo halftone process on multivalued image data comprising a plurality of planes, the device including a component executing quantization and outputting for each of the plurality of density components, a component determining a correction value on the basis of a sign of a quantization error in each plane and a comparison of a sum of the quantization errors with a predetermined threshold, and a component correcting a value of the quantization output using the correction value and diffusing the quantization value.

28 Claims, 9 Drawing Sheets

IMAGE PROCESSING DEVICE AND IMAGE PROCESSING METHOD

BACKGROUND OF THE INVENTION

1. Field of the Invention

The present invention relates to an image processing device and a computer-readable storage medium on which an image processing program is recorded. More specifically, the present invention relates to an image processing method and device which quantizes input data into binary or multivalued data while maintaining the difference between an input image density and an output image density by an error diffusion method, as well as a computer-readable storage medium on which an image processing program for executing the image processing method is recorded.

2. Description of the Related Art

A pseudo halftone process conventionally represents input multivalued image data as binary image data or multivalued image data at a level lower than that of the input multivalued image data. The pseudo halftone process is a technique for converting an image represented at multivalued gray scales into an image represented at halftone gray scales using, for example, binary image data composed of only white and black points. A typical example of the pseudo halftone process is an error diffusion method. The error diffusion method is a technique for distributing an error resulting from a conversion of a target pixel to pixels adjacent to the target pixel; in this conversion, for example, multivalued image data is converted into monochromatic binary image data on the basis of a predetermined threshold. The error diffusion method enables halftones to be represented with the entire error reduced. That is, the error diffusion method distributes an error resulting from a conversion of multivalued image data into binary image data, to substantially zero accumulative errors in the colors of the entire image. With the error diffusion method, the target pixel and its density are defined as P and v, respectively. The densities of unbinarized pixels P0, P1, P2, and P3 present around the pixel P are defined as v0, v1, v2, and v3. A binarization threshold is defined as T. Empirically determined weight factors W0, W1, W2, and W3 are then used to weight a binarization error E at the target point P. The error is then distributed to peripheral pixels P0, P1, P2, and P3. That is, the error diffusion method makes the average density of an output image equal to the density of an input image. When output binary data is defined as o, the equations below determine errors E0, E1, E2, and E3 for the peripheral pixels P0, P1, P2, and P3.

For $v \geq T$, $o=1$, $E=v-V\text{max}$

For $v<T$, $o=0$, $E=v-V\text{min}$ (Vmax: maximum density, Vmin: minimum density)

$E0 = E \times W0;$ $E1 = E \times W1;$ $E2 = E \times W2;$ $E3 = E \times W3;$ (examples of the weight factor: $W0=7/16$, $W1=1/16$, $W2=5/16$, $W3=3/16$).

To output multivalued image data using a cyan (C), magenta (M), yellow (Y), or black (K) ink, color ink jet printers and the like conventionally use the error diffusion method or the like independently for each color to execute the pseudo halftone process. This enables each color to appear excellent but may fail to achieve a high image quality for two or more overlapping images.

Examples of prior techniques for solving this problem are described in, for example, Japanese Patent Laid-Open No. 8-279920 and Japanese Patent Laid-Open No. 11-10918. These prior examples disclose pseudo halftone processing methods of using an error diffusion method for a combination of two or more colors to achieve high visibility even for two or more overlapping colors. Japanese Patent Laid-Open No. 9-139841 discloses a method of independently executing a pseudo halftone process on two or more colors and then modifying an output value on the basis of the sum of input values; this method produces effects similar to those described above.

To reduce the granular feeling of an intermediate density area in a color image, it is effective to execute image processing so that dots of a cyan (C) and magenta (M) components do not overlap. To achieve this, the conventional technique uses a method of processing a color image shown below.

FIG. 8 is a diagram illustrating a conventional method of processing a color image.

In FIG. 8, the pixels and density components (YMCK) of color image data are each represented by 8-bit (gray scale value: 0 to 255) multivalued data. When the density values of a C and M components of an original image are defined as C and M, respectively, the density values Ct and Mt of a cyan (C) and magenta (M) components of an arbitrary target pixel in image data are expressed by equations shown below, where Ce and Me denote values resulting from error diffusion executed on the target pixel with the C and M components.

$Ct = C + Ce$ $MT = M + Me$

The conventional method of processing a color image performs one of four image processing control operations shown below depending on the densities of C and M components of the target pixel. A threshold Th1=128 and a threshold Th2=255+Th1.

1. Dot printing is not executed if (Ct+Mt) is equal to or smaller than the threshold Th1, that is, if it belongs to an area 1 shown in FIG. 8.

2. Dot printing is executed using only the C ink if (Ct+Mt) exceeds the threshold Th1 and if (Ct+Mt) is equal to or smaller than the different threshold Th2 and if Ct>Mt, that is, if (Ct+Mt) belongs an area 2 in FIG. 8.

3. Dot printing is executed using only the M ink if (Ct+Mt) exceeds the threshold Th1 and if (Ct+Mt) is equal to or smaller than the different threshold Th2 and if Ct≦Mt, that is, if (Ct+Mt) belongs an area 3 in FIG. 8.

4. Dot printing is executed using the C and M inks if (Ct+Mt) exceeds the different threshold Th2, that is, if (Ct+Mt) belongs an area 4 in FIG. 8.

However, with the conventional image processing method, an increase in the number of gray scales consistently complicates the above judgment expressions, thus increasing the time required for processing. An algorithm is shown below which is used if, for example, cyan and magenta are quantized into three values using the conventional image processing method.

```
Ct = C + Ce
Mt = M + Me
Cout = 0
```

-continued

```
Mout = 0
if(Ct + Mt) > Threshold1)
    if(Ct + Mt <Threshold2)
        if(Ct > Mt)
            Cout = 1
        else
            Mout = 1
    else
    if{Ct + Mt < Threshold3)
        if(Ct > Mt + Const1)
            Cout = 2
        else
            if(Mt < Ct + COnst1)
                Mout = 2
            else
                Cout = 1
                Mout = 1
    else
        if(Ct + Mt < Threshold4)
            if(Ct > Mt)
                Cout = 2
                Mout = 1
            else
                Cout = 1
                Mout = 2
        else
            Cout = 2
            Mout = 2
```

Thus, the mere quantization of cyan and magenta into three values is a complicated process. Quantization into more gray scales requires a further complicated process.

SUMMARY OF THE INVENTION

An object of the present invention is to provide an image processing method and device which can both quickly and easily execute a pseudo halftone process with a large number of output gray levels and which can always execute the pseudo halftone process in the same manner regardless of the number of output gray scales, as well as computer-readable storage medium on which an image processing program for executing the image processing method is recorded.

To achieve this object, an image processing device in accordance with the present invention executes a pseudo halftone process on multivalued image data comprising a plurality of planes and is characterized by comprising a component allowing image data with a plurality of planes to be input to the device, a component weighting a quantization error near a target pixel for each of the plurality of planes, a first adding component adding the weighted quantization error to the input image data, a second adding component adding a predetermined threshold to an output from the first adding component, a plurality of quantizing components quantizing an output from the second adding component, a first quantization error calculating component calculating a plurality of quantization errors resulting from the quantizing process of the quantizing components, a determining component determining how to correct an output from the quantizing component on the basis of signs of the calculated plurality of quantization errors, a component generating a correction value on the basis of a sum of the plurality of quantization errors and the predetermined threshold, a component correcting the output from the quantizing component using the correction value, and a second quantization error calculating component calculating a quantization error from the corrected output from the quantizing component and inputting the calculation to the component weighting the quantization error.

An image processing device in accordance with the present invention executes a pseudo halftone process on multivalued image data comprising a plurality of planes and is characterized by comprising a component allowing image data with a plurality of planes to be input to the device, a component weighting a quantization error near a target pixel for each of the plurality of planes, a first adding component adding the weighted quantization error to the input image data, a component generating a threshold for each of the plurality of planes, a second adding component adding the threshold to each input image data to which the quantization error has been added, a plurality of quantizing components quantizing the input image data to which the threshold has been added, first quantization error calculating component calculating a plurality of quantization errors resulting from the quantizing process of the quantizing component, a determining component determining how to correct an output from the quantizing component on the basis of signs of the calculated plurality of quantization errors, a component generating a correction value on the basis of a sum of the plurality of quantization errors and the predetermined threshold, a component correcting the output from the quantizing component using the correction value, and a second quantization error calculating component calculating a quantization error from the corrected output from the quantizing component and inputting the calculation to the component weighting the quantization error.

An image processing method in accordance with the present invention executes a pseudo halftone process on multivalued image data comprising a plurality of planes and is characterized by comprising a step of allowing image data with a plurality of planes to be input, a step of weighting a quantization error near a target pixel for each of the plurality of planes, a first adding step of adding the weighted quantization error to the input image data, a second adding step of adding a predetermined threshold to the input image data to which the quantization error has been added, a plurality of quantizing steps of quantizing and outputting the input image data to which the quantization error has been added, a first quantization error calculating step of calculating a plurality of quantization errors resulting from the quantizing process in the quantizing step, a determining step of determining how to correct the quantization output on the basis of signs of the calculated plurality of quantization errors, a step of generating a correction value on the basis of a sum of the plurality of quantization errors and the predetermined threshold, a step of correcting the quantization output using the correction value, and a second quantization error calculating step of calculating a quantization error from the corrected quantization output.

An image processing method in accordance with the present invention executes a pseudo halftone process on multivalued image data comprising a plurality of planes and is characterized by comprising a step of allowing image data with a plurality of planes to be input, a step of weighting a quantization error near a target pixel for each of the plurality of planes, a first adding step of adding the weighted quantization error to the input image data, a step of generating a threshold for each of the plurality of planes, a second adding step of adding the threshold to each input image data to which the quantization error has been added, a plurality of quantizing steps of quantizing and outputting the input image data to which the threshold has been added, a first quantization error calculating step of calculating a plurality of quantization errors resulting from the quantizing step, a determining step of determining how to correct the quantization output on the basis of signs of the calculated plurality of quantization errors, a step of generating a correction value on the basis of a sum of the plurality of quantization errors and the predetermined threshold, a step of correcting the quantization output using the correction value, and a second quantization error calculating step of calculating a quantization error from the corrected quantization output.

A computer-readable storage medium in accordance with the present invention is characterized by comprising computer executable commands that instruct a computer to execute a step of allowing image data with a plurality of planes to be input to the computer, a step of weighting a quantization error near a target pixel for each of the plurality of planes, a first adding step of adding the weighted quantization error to the input image data, a second adding step of adding a predetermined threshold to the input image data to which the quantization error has been added, a plurality of quantizing steps of quantizing and outputting the input image data to which the quantization error has been added, a first quantization error calculating step of calculating a plurality of quantization errors resulting from the quantizing process in the quantizing step, a determining step of determining how to correct the quantization output on the basis of signs of the calculated plurality of quantization errors, a step of generating a correction value on the basis of a sum of the plurality of quantization errors and the predetermined threshold, a step of correcting the quantization output using the correction value, and a second quantization error calculating step of calculating a quantization error from the corrected quantization output.

A computer-readable storage medium in accordance with the present invention is characterized by comprising computer executable commands that instruct a computer to execute a step of allowing image data with a plurality of planes to be input to the computer, a step of weighting a quantization error near a target pixel for each of the plurality of planes, a first adding step of adding the weighted quantization error to the input image data, a step of generating a threshold for each of the plurality of planes, a second adding step of adding the threshold to each input image data to which the quantization error has been added, a plurality of quantizing steps of quantizing and outputting the input image data to which the threshold has been added, a first quantization error calculating step of calculating a plurality of quantization errors resulting from the quantizing step, a determining step of determining how to correct the quantization output on the basis of signs of the calculated plurality of quantization errors, a step of generating a correction value on the basis of a sum of the plurality of quantization errors and the predetermined threshold, a step of correcting the quantization output using the correction value, and a second quantization error calculating step of calculating a quantization error from the corrected quantization output.

An image processing device in accordance with the present invention executes a pseudo halftone process on multivalued image data comprising a plurality of density components and is characterized by comprising a component executing quantization and outputting for each of the plurality of density components, a component determining a correction value on the basis of a sign of a quantization error in each density component and a comparison of a sum of the quantization errors with a predetermined threshold, and a component correcting a value of the quantization output using the correction value and diffusing the quantization value.

An image processing method in accordance with the present invention executes a pseudo halftone process on multivalued image data comprising a plurality of density components and is characterized by comprising a step of executing quantization and outputting for each of the plurality of density components, a step of determining a correction value on the basis of a sign of a quantization error in each density component and a comparison of a sum of the quantization errors with a predetermined threshold, and a step of correcting a value of the quantization output using the correction value and diffusing the quantization value.

A computer-readable storage medium in accordance with the present invention is characterized by comprising computer executable commands that instruct a computer to execute a step of executing quantization and outputting for each of the plurality of density components, a step of determining a correction value on the basis of a sign of a quantization error in each density component and a comparison of a sum of the quantization errors with a predetermined threshold, and a step of correcting a value of the quantization output using the correction value and diffusing the quantization value.

The present invention can both quickly and easily execute a pseudo halftone process with a large number of output gray scales and can always execute the pseudo halftone process in the same manner regardless of the number of output gray scales.

The present invention also determines a correction area on the basis of the match between the signs of the quantization errors and the comparison of the sum of the quantization errors with the threshold. This facilitates the determination of the correction area and the generation of a correction value. The present invention also determines the priorities of the planes to be corrected on the basis of the numbers of quantization error signs for neighborhood pixels. This enables dots to be efficiently distributed using a small memory capacity. If the quantization errors in the neighborhood pixels have the same sign, the connections between dots in the same plane can be excluded by using random numbers to determine the priorities. These processes are independent of the number of quantization levels. This enables the present method to be easily expanded so as to be applicable to error diffusion for N values. The present method can be easily expanded so as to be applicable to three or more planes as described above.

The above and other objects, effects, features and advantages of the present invention will become more apparent from the following description of embodiments thereof taken in conjunction with the accompanying drawings.

DESCRIPTION OF THE PREFERRED EMBODIMENTS

First Embodiment

Embodiments of the present invention will be described below with reference to the drawings.

Figure 1:
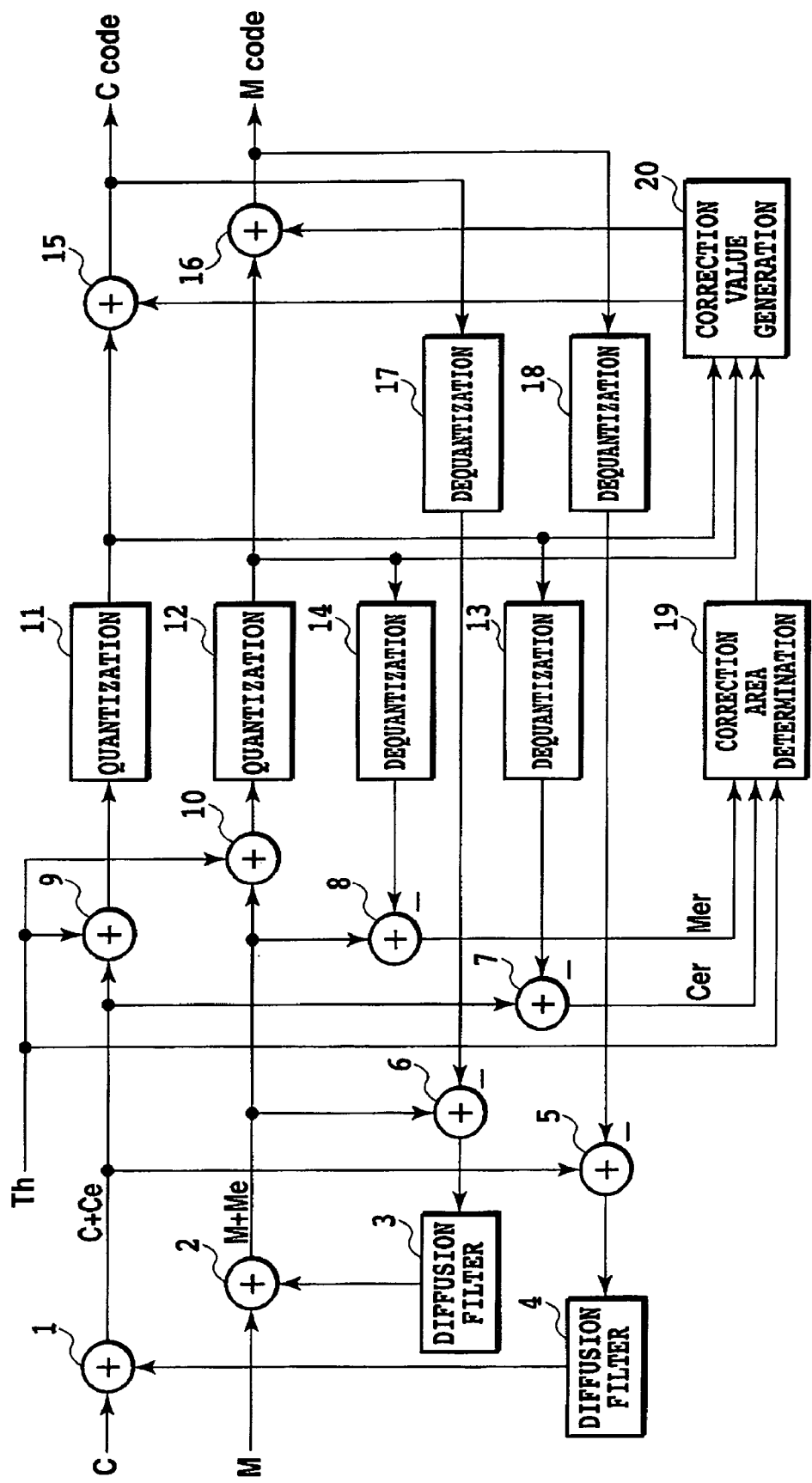
FIG. 1 is a block diagram showing the configuration of an illustrative image processing device in accordance with a first embodiment of the present invention.

FIG. 1 is a block diagram illustrating an image processing device in accordance with the first embodiment of the present invention. For convenience, two planes for cyan and magenta are processed. That is, planes for color image data in accordance with the present embodiment are color planes for output colors into which the color image data is discomposed. The present embodiment uses four color planes for C, M, Y, and K. However, the color planes are not limited to these four colors.

In FIG. 1, reference numerals 1, 2, 9, 10, 15, and 16 denote adders, and reference numerals 3 and 4 denote diffusion filters. Reference numerals 5, 6, 7, and 8 denote subtractors, and reference numerals 11 and 12 denote quantizers. Reference numerals 13, 14, 17, and 18 denote dequantizers, and reference numerals 19 and 20 denotes a correction area determining section and a correction value generating section, respectively.

First, main operations of each section will be described.

The diffusion filters 3 and 4 multiply a quantization error in a diffusion target pixel by a corresponding diffusion factor to determine sums Ce and Me. The adders 1 and 2 add the sums output by the diffusion filters 3 and 4, to pixel values C and M of an input image as correction values. The adders 1 and 2 then output corrected pixel values (C+Ce, M+Me) of the input image. The adders 9 and 10 add a threshold Th to each of the corrected pixel values (C+Ce, M+Me) of the input image. The quantizers 11 and 12 use a predetermined quantizing step to quantize the corrected pixel values (C+Ce+Th, M+Me+Th) of the input pixel to which the threshold Th has been added, and then outputs output codes. The dequantizers 13 and 14 convert the output codes from the quantizers 11 and 12 into respective quantization representative values. The subtractors 7 and 8 subtract the quantization representative values output by the dequantizers 13 and 14, from the corrected pixel values (C+Ce, M+Me) of the input pixel, to generate pre-quantization-code-correction quantization errors (Cer, Mer). The subtractors 7 and 8 then input the quantization errors (Cer, Mer) to the correction area determining section 19. The correction area determining section 19 determines whether or not the errors are inside a correction area on the basis of the signs of the pre-correction quantization errors and the threshold Th. If the correction area determining section 19 determines that the errors are inside the correction area, it inputs correction values (−1, 0, +1) for the respective color planes to the correction value generating section 20. The correction value generating section 20 modifies the correction values on the basis of the output codes from the quantizers 11 and 12. The correction value generating section 20 inputs resulting output code correction values to the adders 15 and 16. The adders 15 and 16 add the output codes from the quantizers 11 and 12 to the output code correction values input by the correction value generating section 20, to correct the output codes. The adders 15 and 16 then output Ccode and Mcode. The dequantizers 17 and 18 convert the corrected output codes Ccode and Mcode into respective quantization representative values. The subtractors 5 and 6 subtract the quantization representative values output by the dequantizers 17 and 18, from the pixel values (C+Ce, M+Me) of the input image which have been corrected by the diffusion filters 3 and 4.

Now, a specific process will be described in detail. Specific values in the description below are obtained if the present invention is applied to three-valued error diffusion.

The adders 9 and 10 add the threshold Th to each of the input pixel values (C+Ce, M+Me) corrected by peripheral quantization errors. Here, the quantization characteristic of the quantizers 11 and 12 is assumed to be linear. An input pixel value is defined as x. Then, an output code c (output values from the quantizers 11 and 12) and a quantization representative value r (output values from the dequantizers 13 and 14) are expressed as follows. For the input pixel value x<64, the output code c=0, the quantization representative value r=0, For 64≦the input pixel value x<192, the output code c=1, the quantization representative value r=128, and For 192≦the input pixel value x, the output code c=2, the quantization representative value r=255.

The output code c is obtained by adding the threshold Th to the input pixel value and extracting a carry and an MSB (Most Significant Bit). The quantization representative value r is obtained by adding 64 to the input pixel value as the threshold Th and padding the lower 7 bits of the addition result with 0. However, the quantization representative value r=256 generated by the above method for the output code c=2 exceeds the range of the input pixel value. Accordingly, for the carry of 1, all the bits of the quantization representative value are 1 (that is, 255). This simplifies the quantizers 11 and 12 and the dequantizers 13, 14, 17, and 18.

Now, with reference to FIG. 2, a detailed description will be given of a specific correcting process executed by the correction area determining section 19 and correction value generating section 20.

Figure 2:
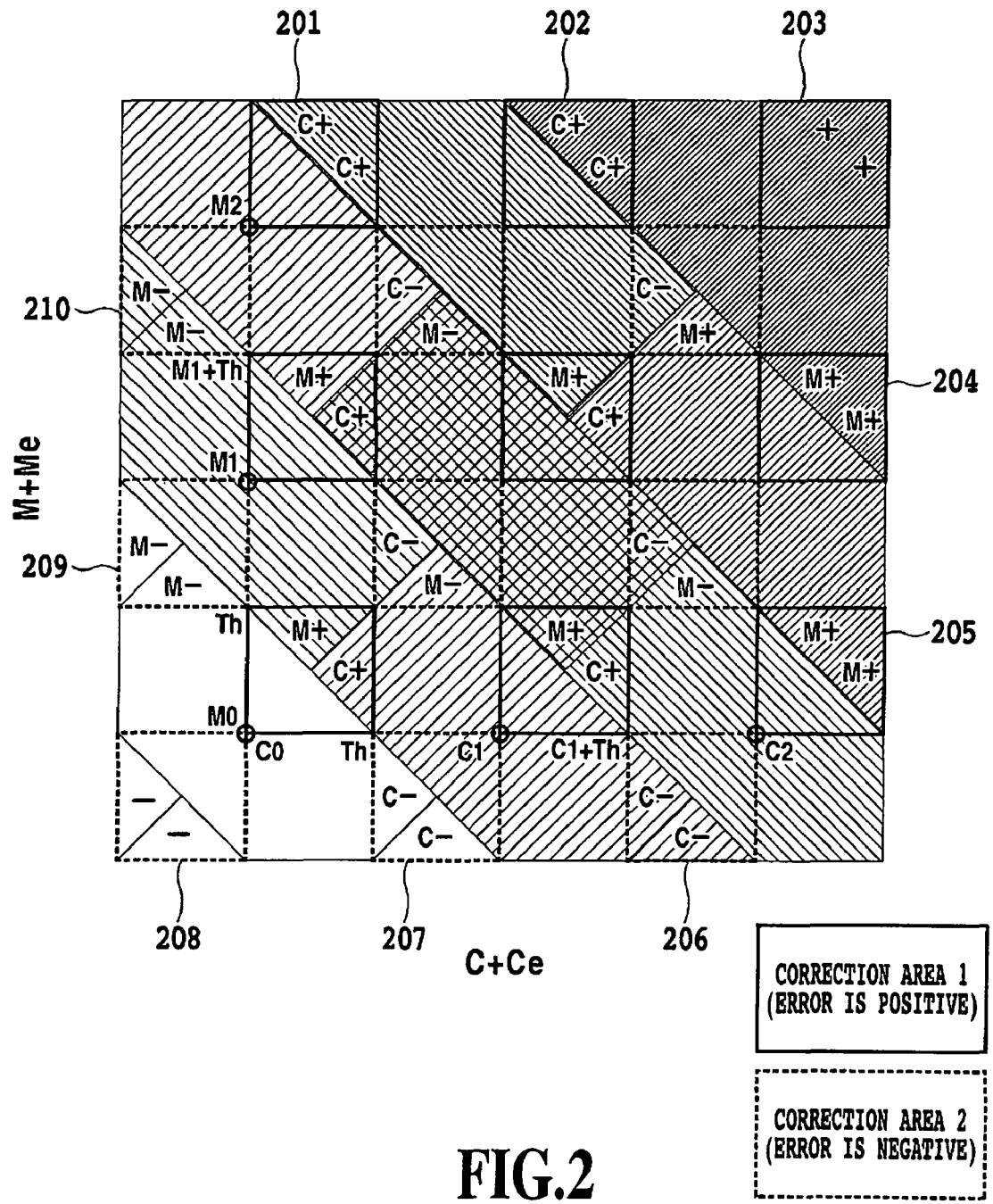
FIG. 2 is a diagram illustrating a correcting process in accordance with the first embodiment of the present invention.

FIG. 2 is a diagram illustrating a correcting process in accordance with the first embodiment of the present invention. In the description below, the pre-correction quantization errors (output values from the subtractors 7 and 8) are defined as Cer and Mer. The quantizing step is defined as Qs.

The correction values Ce and Me for error diffusion are in the −64~+63 range. The corrected input pixel data is thus in the −64~+318 range.

In FIG. 2, in an area (correction area 1) enclosed by a thick line, the signs of the pre-correction quantization errors (Cer, Mer) in the two color planes are the same and positive. In this area, when the sum Cer+Mer of the pre-correction quantization errors exceeds the threshold Th, the correction value for the larger quantization error (Cer or Mer) is +1, while the correction value for the other quantization error is 0. If the sum Cer+Mer of the pre-correction quantization errors is at most the threshold Th, both correction values are 0.

However, if one of the output codes is beyond the range (areas 201, 202, 204, and 205 in the figure) as a result of the correction, the other output code is corrected. If both output codes are beyond the range (area 203 in the figure) as a result of the correction, the correction is not executed (correction values are 0).

In an area (correction area 2) enclosed by a thick dotted line, the signs of the pre-correction quantization errors (Cer, Mer) in the two color planes are the same and negative. In this area, when the sum Cer+Mer of the pre-correction quantization errors is at most the value Th−Qs (in this example, −64) obtained by subtracting the quantizing step Qs from the threshold Qs, the correction value for the smaller quantization error (having a larger absolute value) is −1, while the correction value for the other quantization error is 0. Otherwise both correction values are 0.

However, if one of the output codes is beyond the range (areas 206, 207, 209, and 210 in the figure) as a result of the correction, the other output code is corrected. If both output codes are beyond the range (area 208 in the figure) as a result of the correction, the correction is not executed (correction values are 0).

Figure 7:
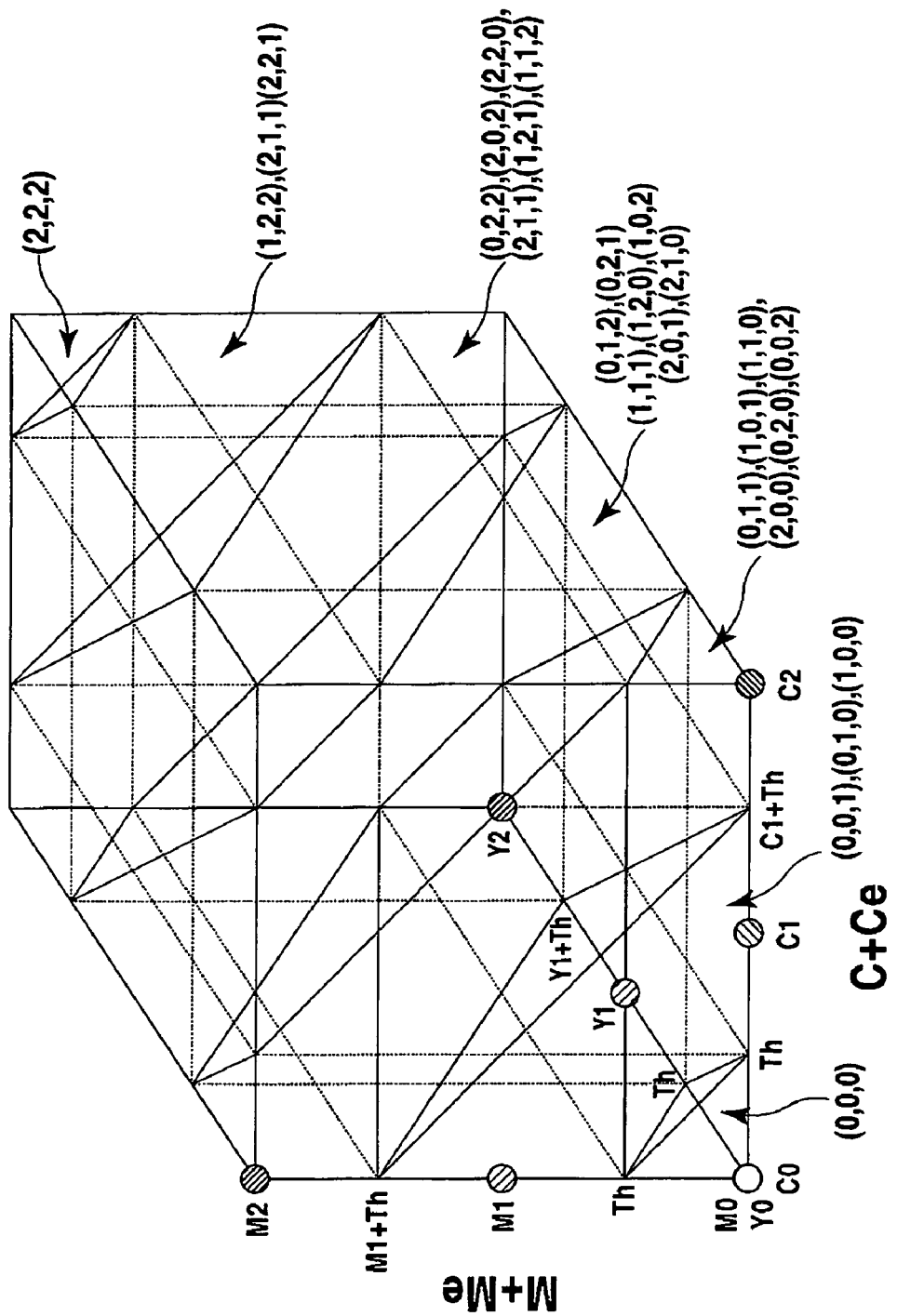
FIG. 7 is a conceptual drawing showing that the first embodiment of the present invention is applied to three planes.
Figure 8:
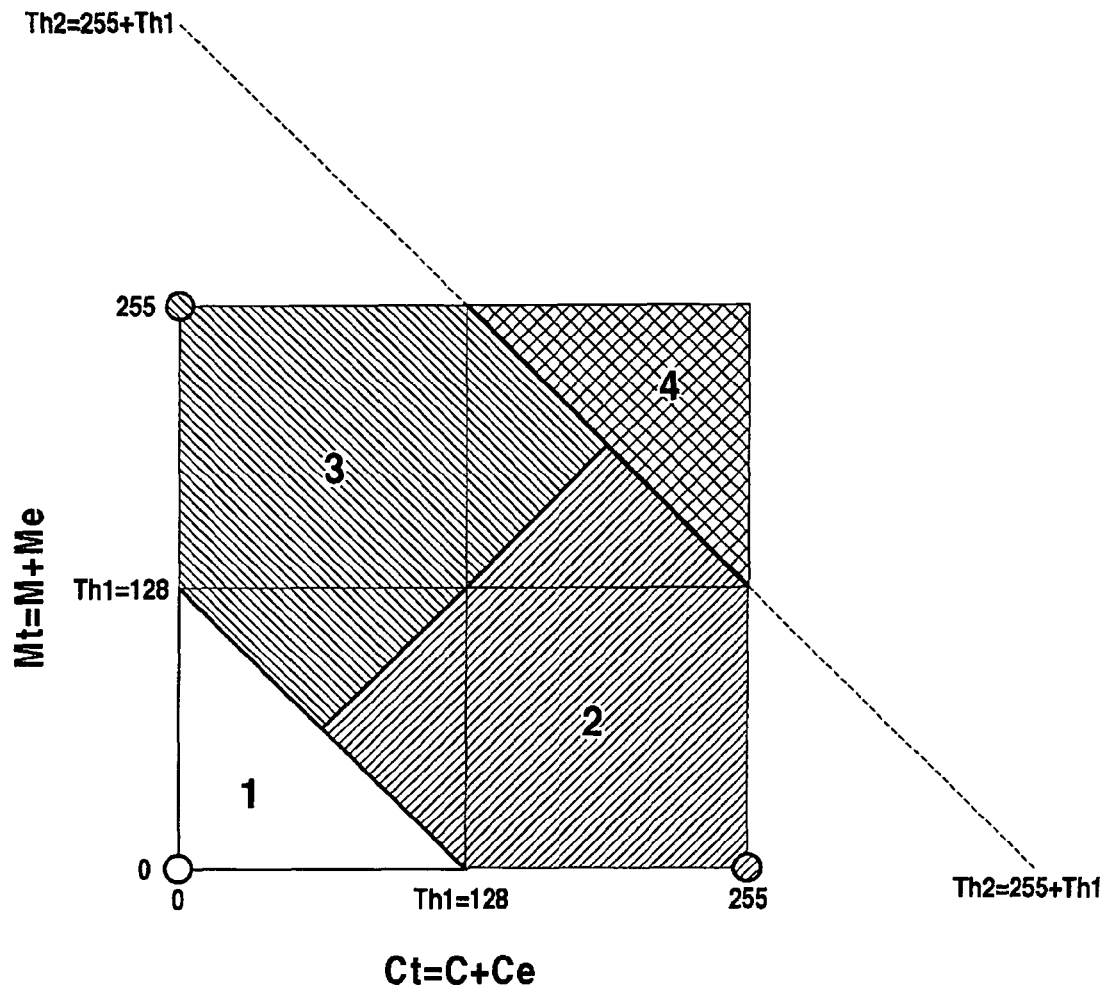
FIG. 8 is a diagram illustrating a conventional correcting process.

FIG. 7 is a conceptual drawing in which the first embodiment of the present invention is applied to three color planes. As shown in the figure, the three color planes are divided into seven areas on the basis of the threshold Th. A combination of output codes generated in each area is shown in (C, M, Y) form (for example, (0, 0, 0) or (0, 0, 1)).

If the quantization errors in the color planes in which they have the same sign are compared and found to have the positive sign, the correction values for the output codes are as follows. If the sum Cer+Mer+Yer of the pre-correction quantization errors exceeds the threshold Th, the correction value is +1 for one of the color planes with the quantization errors having the same sign which has the maximum quantization errors. The correction value is 0 for the other color planes. If the sum of the pre-correction quantization errors is at most the threshold Th, both correction values are 0.

If the signs of the quantization errors are the same and negative, the correction values are as follows. If the sum Cer+Mer+Yer of the pre-correction quantization errors is at most the value Th−Qs (in this example, −64) obtained by subtracting the quantizing step Qs from the threshold Th, the correction value is −1 for one of the color planes with the quantization errors having the same sign which has the minimum quantization errors. The correction value is 0 for the other color planes. If the sum of the pre-correction quantization errors exceeds the value Th−Qs, both correction values are 0. However, if one of the output codes is beyond the range as a result of the correction, the output codes are corrected in the descending order of closeness to the quantization errors in one of the color planes with the quantization errors having the same sign which is to be corrected. If all output codes are beyond the range as a result of the correction, the correction is not executed (correction value is 0).

The first embodiment of the present invention thus determines the correction area using the signs of the quantization errors. This enables the correction area to be easily determined. At the same time, the sign of the correction value is determined. These processes are independent of the number of quantization levels. This enables the present method to be easily expanded so as to be applicable to error diffusion for N values. The present method can be easily expanded so as to be applicable to four or more planes as described above.

Second Embodiment

Figure 3:
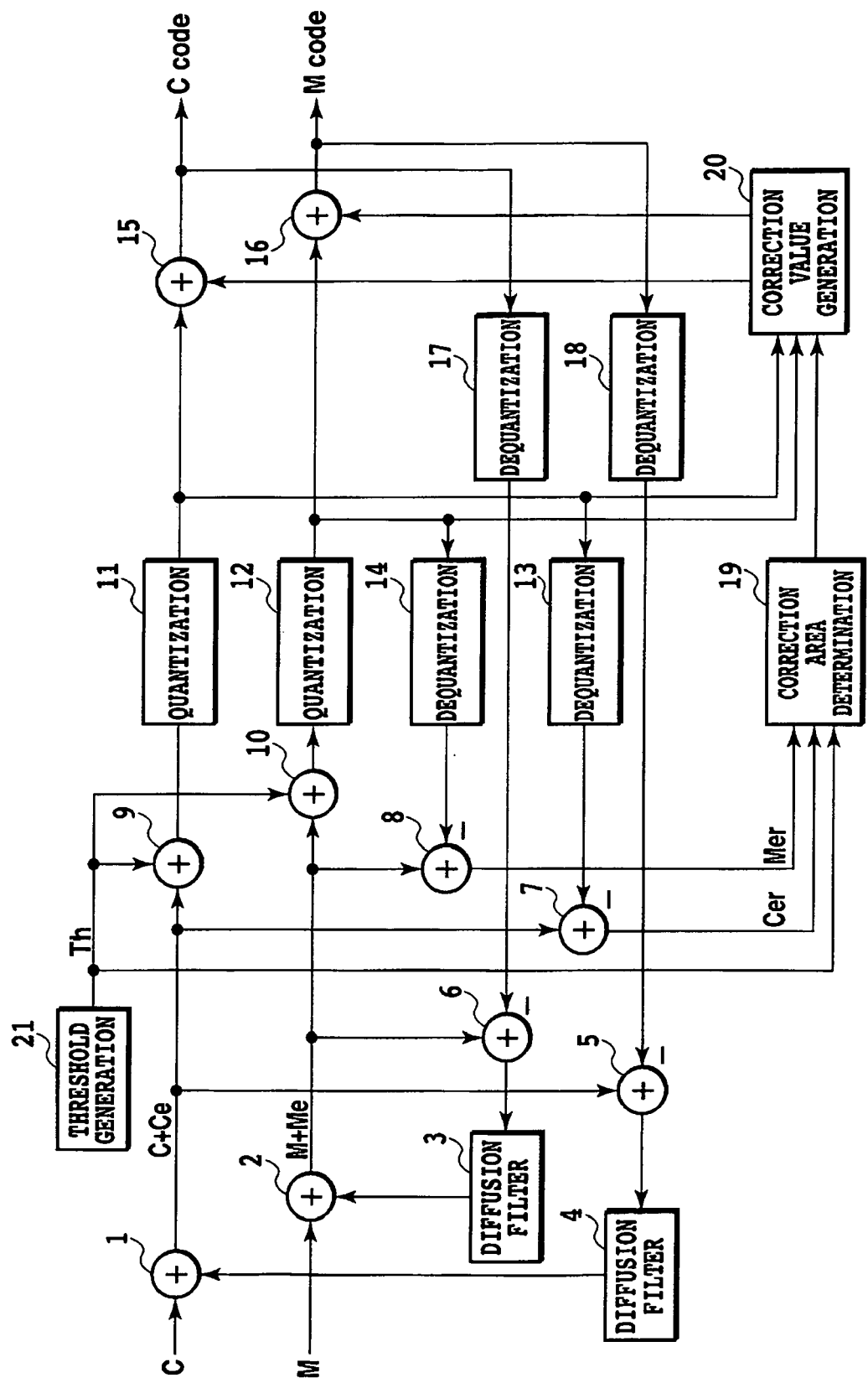
FIG. 3 is a block diagram showing the configuration of an illustrative image processing device in accordance with a second embodiment of the present invention.

FIG. 3 is a block diagram illustrating the configuration of an image processing device in accordance with a second embodiment of the present invention. In the figure, reference numeral 21 denotes a threshold generating section. Only the differences from the first embodiment will be described below.

In spite of the sequential variation of the threshold by the threshold generating section 21, the second embodiment enables the overlapping of color planes to be controlled on the basis of determinations similar to those described in the first embodiment. In the present embodiment, the planes in color image data correspond to the data on colors resulting from color separation.

The threshold generating section 21 varies the threshold in order to eliminate "sweep-up" or "texture" that may degrade image quality in error diffusion. The "sweep-up" appears markedly at an edge adjacent to an input value close to a quantization representative value. A known method thus hastens (delays) the generation of dots by varying the threshold so that it becomes closer to the quantization representative value closest to the input value, depending on the difference between the quantization representative value and the input value. In the second embodiment, a plurality of input values are present, so that the effect depends on the input value used. If the threshold is varied using, for example, the sum C+M of the pixel values of the input image, the "sweep-up" on dots in the two planes is reduced. However, eliminating the "sweep-up" occurring only in a specific color plane is difficult. That is, even when the input value for a certain color plane is very close to the quantization representative value, if the input value for the other color plane is sufficiently far from the quantization representative value, the variation of the threshold and the effect of the method are reduced. If the threshold is varied using the input value closer to the quantization representative value, the "sweep-up" in a particular color plane can be effectively eliminated. However, this may be overcompensation for other color planes. The threshold is thus determined on the basis of the weighted average of the average of input pixel values for a plurality of planes and the input value for the plane closest to the quantization representative value.

To deal with the "texture", a random number with its amplitude limited are used to disconnect the dots from one another. The threshold generating section 21 thus outputs a threshold obtained by adding the amplitude limited random number to the threshold resulting from the weighted average. In this case, limitations must be made so that the threshold resulting from the addition of the random number does not exceed the threshold range.

A threshold may be generated using, as a varying value, a random number having its amplitude limited on the basis of the difference between the average of the input pixel values for the plurality of planes and the average of quantization representative values adjacent to the average value. Alternatively, a threshold may be generated using, as a varying value, a random number having its amplitude limited on the basis of the difference between the input pixel value for the plane closest to the quantization representative value and the average of quantization representative values adjacent to the average value. Alternatively, a threshold may be generated using, as a varying value, a random number having its amplitude limited on the basis of the weight average of these differences. The sign of the varying value is set so that the varying value becomes closer to the input pixel value for the plane closest to the quantization representative value and the quantization representative value closest to the input pixel value.

Figure 4:
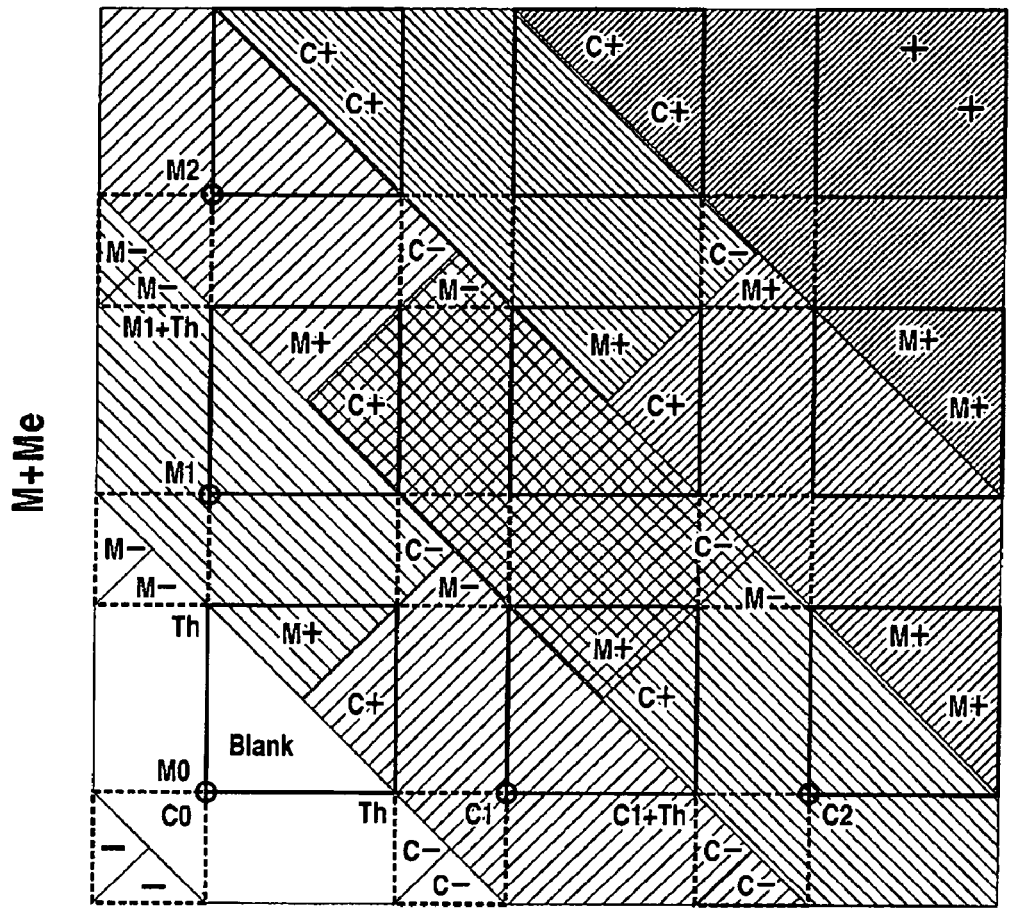
FIG. 4 is a diagram illustrating a correcting process in accordance with the second embodiment of the present invention.

Now, with reference to FIG. 4, a detailed description will be given of a specific correcting process executed by the correction area determining section 19 and correction value generating section 20. FIG. 4 illustrates a correcting process in accordance with the second embodiment. In the description below, the pre-correction quantization errors (output values from the subtractors 7 and 8) are defined as Cer and Mer. The quantizing step is defined as Qs.

The correction values Ce and Me for error diffusion are in the −127~+127 range depending on the variation in threshold. The input pixel data subjected to the error diffusion correction is thus in the −127~+382 range.

In FIG. 4, in an area (correction area 1) enclosed by a thick line, the signs of the pre-correction quantization errors (Cer, Mer) in the two color planes are the same and positive. In this area, when the sum Cer+Mer of the pre-correction quantization errors exceeds the threshold Th, the correction value for the larger quantization error is +1, while the correction value for the other quantization error is 0. If the sum Cer+Mer of the pre-correction quantization errors is at most the threshold Th, both correction values are 0. In an area (correction area 2) enclosed by a thick dotted line, the signs of the pre-correction quantization errors in the two color planes are the same and negative. In this area, when the sum Cer+Mer of the pre-correction quantization errors is at most the value Th−Qs obtained by subtracting the quantizing step Qs from the threshold Qs, the correction value for the smaller quantization error (having a larger absolute value) is −1, while the correction value for the other quantization error is 0. Otherwise both correction values are 0. However, if one of the output codes is beyond the range as a result of the correction, the other output code is corrected. If both output codes are beyond the range as a result of the correction, the correction is not executed (correction values are 0).

FIG. 4 shows that in spite of a variation in threshold, the overlapping of dots between planes can be controlled as in the case of FIG. 2.

Third Embodiment

Figure 5:
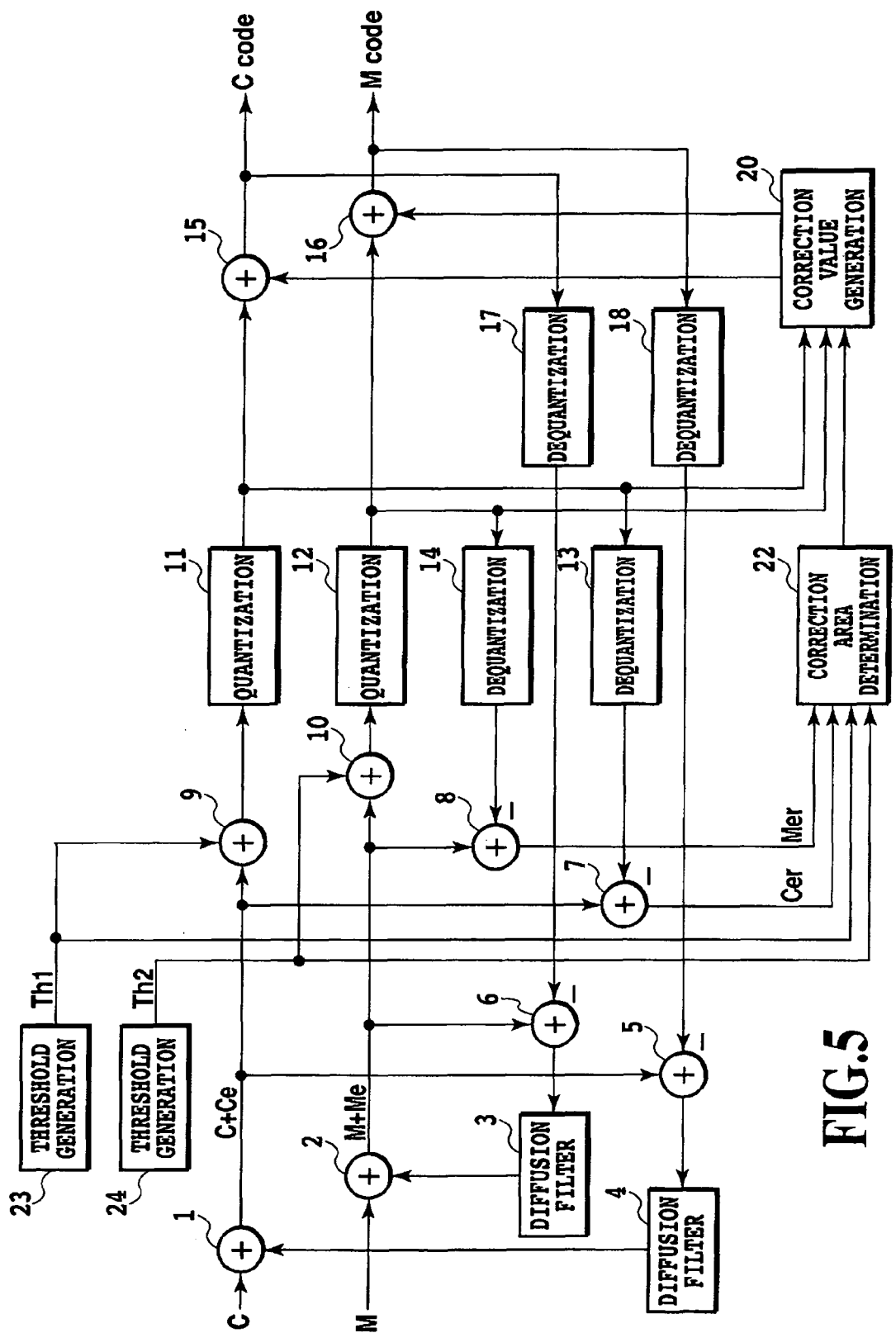
FIG. 5 is a block diagram showing the configuration of an illustrative image processing device in accordance with a third embodiment of the present invention.

FIG. 5 is a block diagram illustrating the configuration of an image processing device in accordance with a third embodiment of the present invention. In the figure, reference numeral 22 denotes a correction area determining section, and reference numerals 23 and 24 denote threshold generating sections. Only the differences from the second embodiment will be described below.

In spite of the sequential variation of the threshold by the threshold generating sections 23 and 24, the third embodiment enables the overlapping of color planes to be controlled on the basis of determinations similar to those described in the first embodiment.

As described above, if a common threshold is used for a plurality of color planes, eliminating "sweep-up" without any problem is very difficult. Specifically, if the threshold is varied to eliminate the "sweep-up" from a certain color plane, overcompensation (sticking of dots to the edge or the like) may occur in other color planes, thus degrading image quality. Thus, the present embodiment generates the optimum threshold for each color plane.

Figure 6:
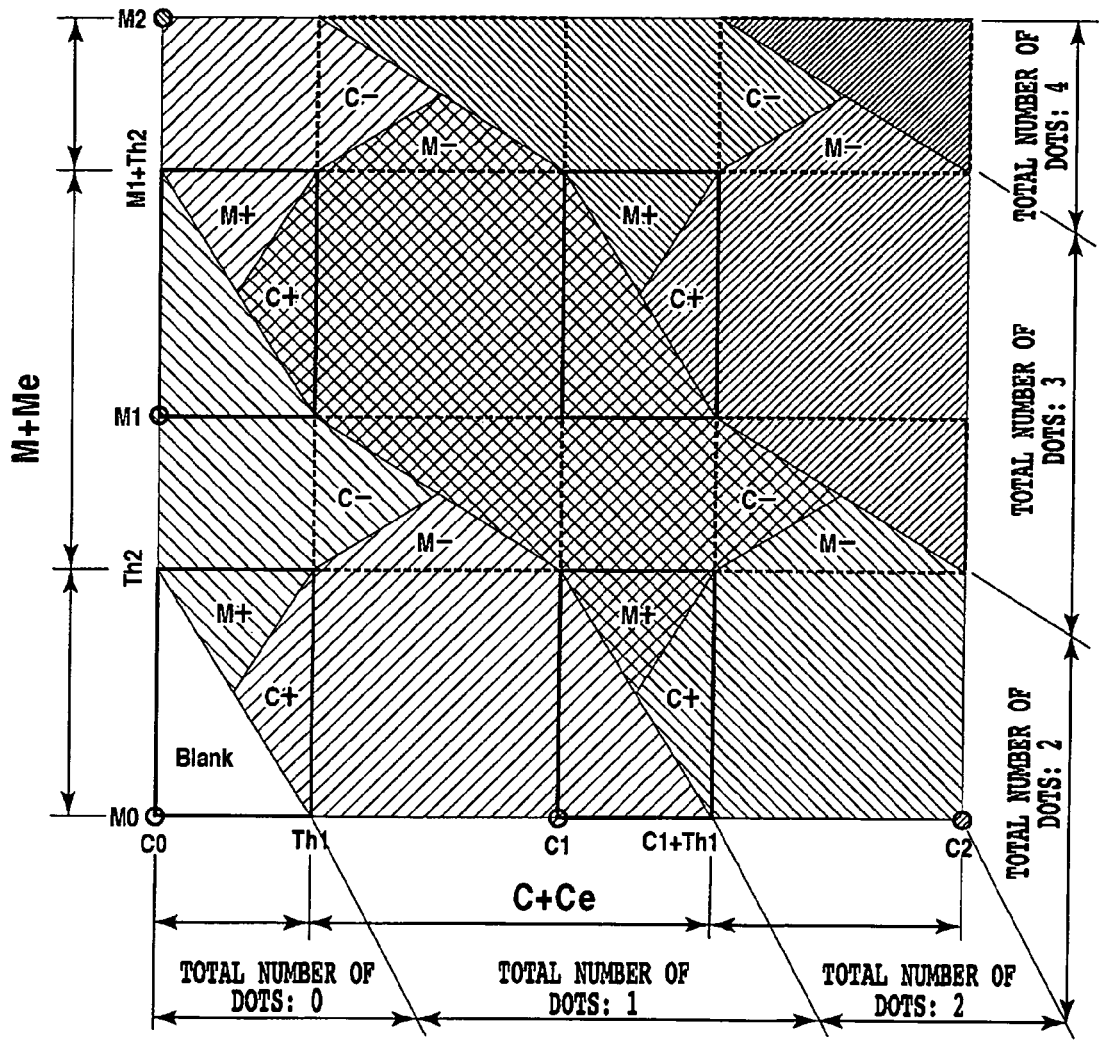
FIG. 6 is a diagram illustrating a correcting process in accordance with the third embodiment of the present invention.

Now, with reference to FIG. 6, a detailed description will be given of a specific correcting process executed by the correction area determining section 19 and correction value generating section 20. FIG. 6 illustrates a correcting process in accordance with the third embodiment. In the description below, the pre-correction quantization errors (output values from the subtractors 7 and 8) are defined as Cer and Mer. The quantizing step is defined as Qs. Thresholds for a C and M planes are defined as Th1 and Th2, respectively.

As in the case of the second embodiment, the correction values Ce and Me for error diffusion are in the −127~+127 range depending on the variation in threshold. The input pixel data subjected to the error diffusion correction is thus in the −127~+382 range. In FIG. 6, the areas with the codes beyond the input range are omitted.

In FIG. 4, in an area (correction area 1) enclosed by a thick line, the signs of the pre-correction quantization errors (Cer, Mer) in the two color planes are the same and positive. In this area, when the sum Cer·Th2+Mer·Th2 of the quantization errors subjected to the threshold variation correction and not to the output code correction exceeds the product of the thresholds Th1 and Th2, the correction value for the larger of the quantization errors subjected to the threshold variation correction is +1, while the correction value for the other quantization error is 0. If the sum Cer·Th2+Mer·Th2 of the quantization errors subjected to the threshold variation correction and not to the output code correction is at most the product of the threshold Th1 and Th2, both correction values are 0.

In an area (correction area 2) enclosed by a thick dotted line, the signs of the pre-correction quantization errors (Cer, Mer) in the two color planes are the same and negative. In this area, the correction values are as follows. If the sum Cer·(Qs−Th2)+Mer·(Qs−Th1) of the pre-correction quantization errors is at most the value−(Qs−Th1)·(Qs−Th2), the correction value for the smaller quantization error (having a larger absolute value) is −1, while the correction value for the other quantization error is 0. Otherwise both correction values are 0.

However, as in the case of the second embodiment, if one of the output codes is beyond the range as a result of the correction, the other output code is corrected. If both output codes are beyond the range as a result of the correction, the correction is not executed (correction values are 0).

Thus, in spite of the sequential variation of the threshold for each color plane, the third embodiment of the present invention determines the correction area on the basis of the signs of the quantization errors. This enables the correction area to be easily determined. At the same time, the sign of the correction value is determined. These processes are independent of the number of quantization levels. This enables the present method to be easily expanded so as to be applicable to error diffusion for N values. The present method can be easily expanded so as to be applicable not only to the two plane colors, C and M, but also to planes for more colors.

The above embodiments have been described in conjunction with the planes for the different colors. However, the present invention is not limited to this. Similar effects can be expected from planes for the same color provided that they are considered to be different.

If the output device can generate two types of dots, that is, large and small dots of different dot diameters (ejection amounts), component is provided for separating input image data into planes for the two types of dots, the large and small dots. Density values resulting from the separation are used as input data. For example, an output color separating section (not shown) separates R, G, and B input image data into six planes for C, c, M, m, and Y, and K (C denotes large cyan dots, c denotes small cyan dots, M denotes large magenta dots, and m denotes small magenta dots). C and c (or M and m) are used as density data input to the quantizing section. For example, the input M in FIG. 1 may be replaced with c.

Fourth Embodiment

Figure 9:
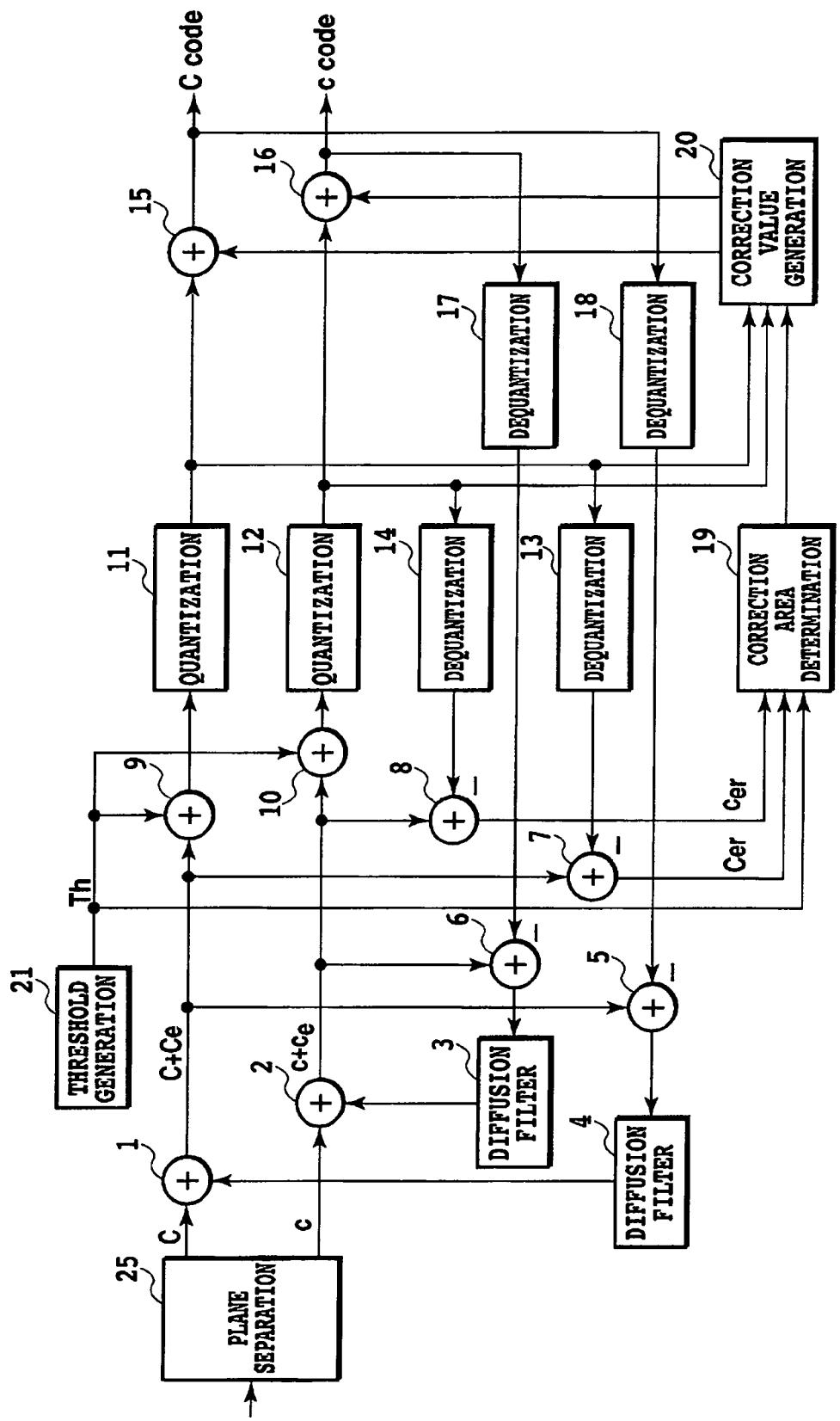
FIG. 9 is a diagram illustrating a correcting process in accordance with the third embodiment of the present invention.

FIG. 9 is a block diagram illustrating the configuration of an image processing device in accordance with a fourth embodiment of the present invention. In the figure, reference numeral 25 denotes a plane separating section. Only the differences from the second embodiment will be described below.

In the fourth embodiment, the plane separating section 25 separates an input density value into plurality of planes, each of which is then quantized. A correction value section then corrects output codes to enable the overlapping of dots between planes to be controlled. The present configuration allows dots for the same color to be treated as different planes. This enables the overlapping of dots to be controlled to correct the granular feeling. The manner of the distribution in the plane separating section 25 can be controlled so that large and small dots can be smoothly switched to achieve smooth gradation. Moreover, the appropriate distribution of the large and small dots enables the utilization of the large and small nozzles to be equalized. This makes it possible to facilitate the maintenance of output image quality and to allow the heads to last longer. Such a plane separating section 25 can be formed into a lookup table.

The correcting method in the present embodiment is similar to that in the second embodiment and will thus not be described below. The above embodiments have been described in conjunction with the large and small dots. However, the present invention is not limited to this. The input data may be separated into planes for large, medium, and small dots or for more dot sizes. Even when printing is executed using a plurality of print materials having the same hue but different densities, the techniques described in the above embodiments are applicable. For example, if dark and light print materials are used for printing, the data may be separated into dark and light planes that are considered to be different. This makes it possible to produce effects similar to those exerted if the data is separated into planes for different colors or different dot sizes.

The present invention may be executed by reading program codes implementing the functions of the above embodiments, from storage medium on which the program codes are recorded.

In this case, the read program codes themselves constitutes the new functions of the present invention. The storage medium storing the program codes constitutes the present invention.

Examples of storage medium supplying the program codes include, for example, a flexible disk, a hard disk, an optical disk, a magneto optic disk, a CD-ROM, a CD-R, a magnetic tape, a nonvolatile memory card, and a ROM.

The present invention is also applicable to the distribution of a program via a communication line for personal computer communications or the like from the storage medium on which the program codes of software implementing the functions of the above embodiments are recorded.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application No. 2005-110070 filed Apr. 6, 2005, which is hereby incorporated by reference herein.

What is claimed is:

1. An image processing device that executes a pseudo halftone process on multivalued image data comprising a plurality of planes, the device comprising:

a component allowing image data with a plurality of planes to be input to the device;

a component weighting a quantization error near a target pixel for each of the plurality of planes;

a first adding component adding the weighted quantization error to the input image data;

a second adding component adding a predetermined threshold to an output from the first adding component;

a plurality of quantizing components quantizing an output from the second adding component;

a first quantization error calculating component calculating a plurality of quantization errors resulting from the quantizing process of the quantizing component;

a determining component determining how to correct an output from the quantizing component on the basis of signs of the calculated plurality of quantization errors;

a component generating a correction value on the basis of a sum of the plurality of quantization errors and the predetermined threshold;

a component correcting the output from the quantizing component using the correction value; and a second quantization error calculating component calculating a quantization error from the corrected output from the quantizing component and inputting the calculation to the component weighting the quantization error.

2. The image processing device of claim 1, wherein the determining component determines that the output from the quantizing component be corrected if quantization errors in at least two planes have the same sign.

3. The image processing device of claim 2, wherein the correction value is +1 or 0 if the signs of the quantization errors are the same and positive, or is −1 or 0 if the signs of the quantization errors are the same and negative.

4. The image processing device of claim 3, wherein if the signs of the quantization errors are the same and positive, when a sum of pre-correction quantization errors is larger than a threshold, the correction value is +1 for one of the planes with quantization errors having the same sign which has the maximum quantization error, and is 0 for the other planes, or when the sum of the pre-correction quantization errors is at most the threshold, the correction value is 0 for all the planes.

5. The image processing device of claim 3, wherein if the signs of the quantization errors are the same and negative, when the sum of the pre-correction quantization errors is at most a value Th−Qs obtained by subtracting a quantizing step Qs from the threshold Th, the correction value is −1 for one of the planes with quantization errors having the same sign which has the minimum quantization error, and is 0 for the other planes, or when the sum of the pre-correction quantization errors is larger than the value Th−Qs, the correction value is 0 for all the planes.

6. The image processing device of claim 1, wherein if quantization output codes are beyond their range as a result of the correction, the quantization output codes are corrected in a descending order of closeness to the quantization error in one of the planes with quantization errors having the same sign which is to be corrected, or if all the quantization output codes in the planes with quantization errors having the same sign are beyond their range as a result of the correction, the quantization output codes are corrected in the descending order of closeness to the quantization error in the plane to be corrected, or if all the quantization output codes are beyond their range as a result of the correction, the correction is not executed.

7. The image processing device of claim 1, wherein each of the plurality of planes is separated into dot components having the same color but different dot diameters.

8. The image processing device of claim 1, wherein each of the plurality of planes is separated into dot components having the same color but different densities.

9. The image processing device of claim 1, wherein the threshold is generated using one of the input pixel values for the plurality of planes which is closest to a quantization representative value.

10. The image processing device of claim 1, wherein the threshold is generated by calculating a weighted average of an average of the input pixel values for the plurality of planes and one of the input pixel values which is closest to the quantization representative value.

11. The image processing device of claim 10, wherein the threshold is generated by adding a random number with its amplitude limited to the threshold generated using the weighted average.

12. The image processing device of claim 1, wherein the threshold is generated using, as a varying value, a difference between the average of the input pixel values for the plurality of planes and an average of quantization representative values adjacent to the average value, a difference between a pixel value closest to the quantization representative value and an average of quantization representative values adjacent to the closest pixel value, or a random number with its amplitude limited by a weight average of the two differences, and a sign of the varying value is set so that the varying value becomes closer to the pixel value closest to the quantization representative value and the quantization representative value closest to the closest pixel value.

13. An image processing method of executing a pseudo halftone process on multivalued image data comprising a plurality of planes, comprising the steps of: using an image processing device to perform steps including allowing image data with a plurality of planes to be input; weighting a quantization error near a target pixel for each of the plurality of planes; adding the weighted quantization error to the input image data; adding a predetermined threshold to the input image data to which the quantization error has been added; quantizing and outputting the input image data to which the quantization error has been added; calculating a plurality of quantization errors resulting from the quantizing process in the quantizing step; determining how to correct the quantization output on the basis of signs of the calculated plurality of quantization errors; generating a correction value on the basis of a sum of the plurality of quantization errors and the predetermined threshold; correcting the quantization output using the correction value; and calculating a quantization error from the corrected quantization output.

14. The image processing method of claim 13, wherein the determining step determines that the output from the quantizing step be corrected if quantization errors in at least two planes have the same sign.

15. The image processing method of claim 14, wherein the correction value is +1 or 0 if the signs of the quantization errors are the same and positive, or is −1 or 0 if the signs of the quantization errors are the same and negative.

16. The image processing method of claim 15, wherein if the signs of the quantization errors are the same and positive, when a sum of pre-correction quantization errors is larger than a threshold, the correction value is +1 for one of the planes with quantization errors having the same sign which has the maximum quantization error, and is 0 for the other planes, or when the sum of the pre-correction quantization errors is at most the threshold, the correction value is 0 for all the planes.

17. The image processing method of claim 15, wherein if the signs of the quantization errors are the same and negative, when the sum of the pre-correction quantization errors is at most a value Th−Qs obtained by subtracting a quantizing step Qs from the threshold Th, the correction value is −1 for one of the planes with quantization errors having the same sign which has the minimum quantization error, and is 0 for the other planes, or when the sum of the pre-correction quantization errors is larger than the value Th−Qs, the correction value is 0 for all the planes.

18. The image processing method of claim 13, wherein if quantization output codes are beyond their range as a result of the correction, the quantization output codes are corrected in a descending order of closeness to the quantization error in one of the planes with quantization errors having the same sign which is to be corrected, or if all the quantization output codes in the planes with quantization errors having the same sign are beyond their range as a result of the correction, the quantization output codes are corrected in the descending order of closeness to the quantization error in the plane to be corrected, or if all the quantization output codes are beyond their range as a result of the correction, the correction is not executed.

19. The image processing method of claim 13, wherein each of the plurality of planes is separated into dot components having the same color but different dot diameters.

20. The image processing method of claim 13, wherein each of the plurality of planes is separated into dot components having the same color but different densities.

21. The image processing method of claim 13, wherein the threshold is generated using one of the input pixel values for the plurality of planes which is closest to a quantization representative value.

22. The image processing method of claim 13, wherein the threshold is generated by calculating a weighted average of an average of the input pixel values for the plurality of planes and one of the input pixel values which is closest to the quantization representative value.

23. The image processing method of claim 22, wherein the threshold is generated by adding a random number with its amplitude limited to the threshold generated using the weighted average.

24. The image processing method of claim 13, wherein the threshold is generated using, as a varying value, a difference between the average of the input pixel values for the plurality of planes and an average of quantization representative values adjacent to the average value, a difference between a pixel value closest to the quantization representative value and an average of quantization representative values adjacent to the closest pixel value, or a random number with its amplitude limited by a weight average of the two differences, and a sign of the varying value is set so that the varying value becomes closer to the pixel value closest to the quantization representative value and the quantization representative value closest to the closest pixel value.

25. A non-transitory computer-readable storage medium containing a program to direct a computer to execute the steps of: using an image processing device to perform steps including allowing image data with a plurality of planes to be input to the computer; weighting a quantization error near a target pixel for each of the plurality of planes; adding the weighted quantization error to the input image data; adding a predetermined threshold to the input image data to which the quantization error has been added; quantizing and outputting the input image data to which the quantization error has been added; calculating a plurality of quantization errors resulting from the quantizing process in the quantizing step; determining how to correct the quantization output on the basis of signs of the calculated plurality of quantization errors; generating a correction value on the basis of a sum of the plurality of quantization errors and the predetermined threshold; correcting the quantization output using the correction value; and calculating a quantization error from the corrected quantization output.

26. An image processing device that executes a pseudo halftone process on multivalued image data comprising a plurality of density components, the device comprising: a component executing quantization and outputting for each of the plurality of density components; a component determining a correction value on the basis of a sign of a quantization error in each density component and a comparison of a sum of the quantization errors with a predetermined threshold; and a component correcting a value of the quantization output using the correction value and diffusing the quantization value.

27. An image processing method of executing a pseudo halftone process on multivalued image data comprising a plurality of density components, comprising the steps of: using an image processing device to perform steps including executing quantization and outputting for each of the plurality of density components; determining a correction value on the basis of a sign of a quantization error in each density component and a comparison of a sum of the quantization errors with a predetermined threshold; and correcting a value of the quantization output using the correction value and diffusing the quantization value.

28. A non-transitory computer-readable storage medium containing a program to direct a computer to execute the steps of: using an image processing device to perform steps including executing quantization and outputting for each of the plurality of density components; determining a correction value on the basis of a sign of a quantization error in each density component and a comparison of a sum of the quantization errors with a predetermined threshold; and correcting a value of the quantization output using the correction value and diffusing the quantization value.

* * * * *